United States Patent [19]

Payne

[11] 4,359,302

[45] Nov. 16, 1982

[54] METHOD FOR CUTTING WALLBOARDS

[76] Inventor: Bryan Payne, 3265 Nocturne Rd., Venice, Fla. 33595

[21] Appl. No.: 98,212

[22] Filed: Nov. 28, 1979

[51] Int. Cl.³ .......................... B23C 1/20; B27C 1/00; G04B 5/14
[52] U.S. Cl. ........................................ 409/84; 33/191; 33/DIG. 10; 144/144.5 R; 144/365; 409/130; 409/182
[58] Field of Search .......................... 144/144.5, 323; 409/132, 178, 182, 84, 130; 33/189, 191, DIG. 10; 30/289

[56] References Cited

U.S. PATENT DOCUMENTS

| | | | |
|---|---|---|---|
| 2,887,776 | 5/1959 | Eisner | 33/DIG. 10 |
| 3,733,707 | 5/1973 | Nix | 33/DIG. 10 |
| 3,888,013 | 6/1975 | Benoit | 33/197 |
| 4,059,905 | 11/1977 | Wieting | 33/DIG. 10 |
| 4,096,964 | 6/1978 | Glick | 33/191 X |
| 4,202,388 | 5/1980 | Wieting | 144/144.5 R |

Primary Examiner—Z. R. Bilinsky
Attorney, Agent, or Firm—Hauke and Patalidis

[57] ABSTRACT

An apparatus and method for cutting wallboards, such as gypsum wallboards or rock wallboards to an appropriate size and shape, and for locating utility boxes hidden behind a panelled wall and cutting of a section of the wall at the opening of the utility boxes. The apparatus of the invention comprises a portable hand tool having an adjustable rest for adjusting the depth of cut and a built-in ruler-guide arrangement permitting to cut parallel to a side of a wallboard or permitting to cut circles in a wallboard. The hand tool may be used in combination with a separate locator and cut-out template member positioned in utility boxes mounted behind an installed wall, which provides an indication of the location of each utility box by way of a wallboard puncturing prong, for cutting out an opening in the wallboard, following appropriate guide grooves in the face of the locator and cut-out template.

2 Claims, 14 Drawing Figures

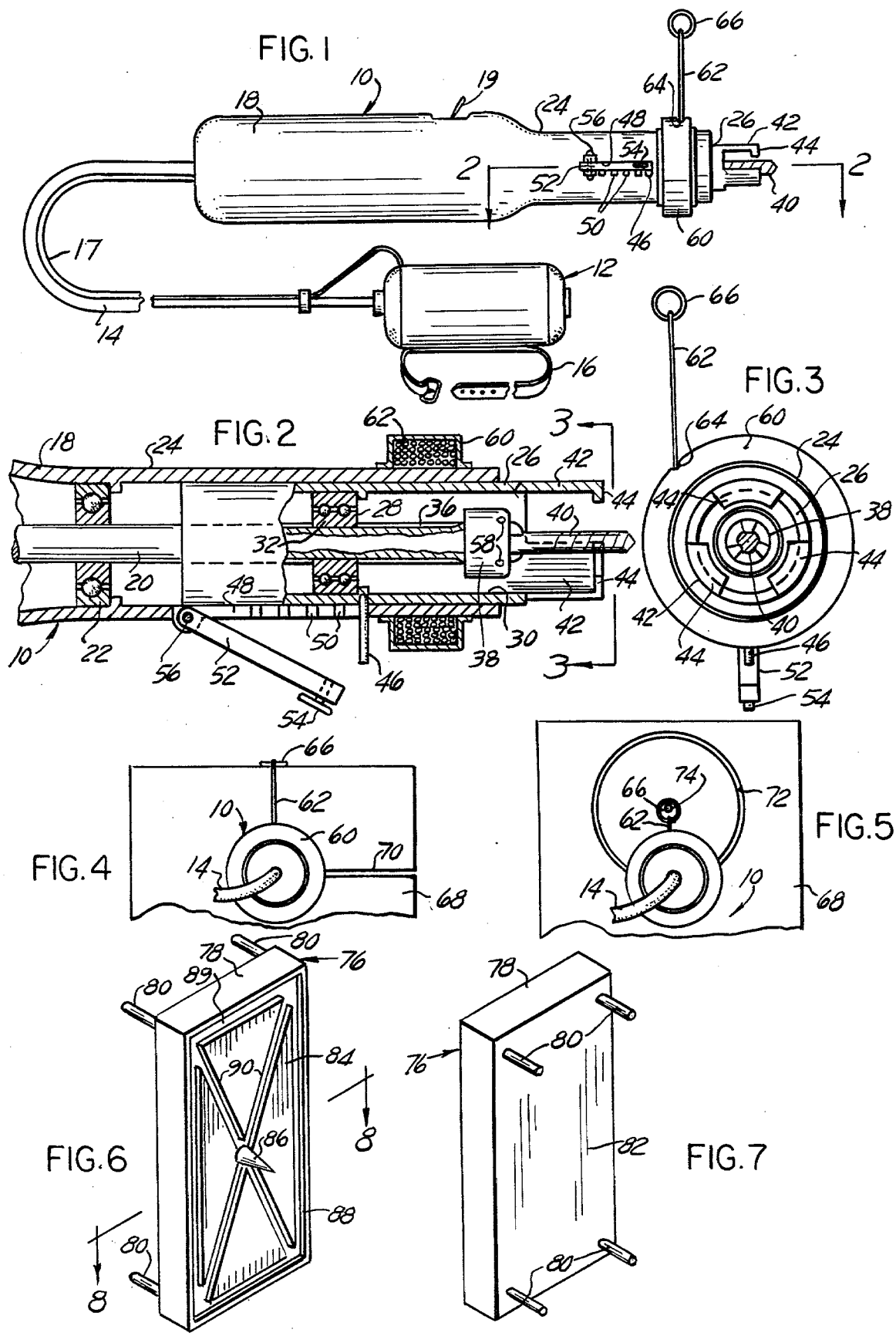

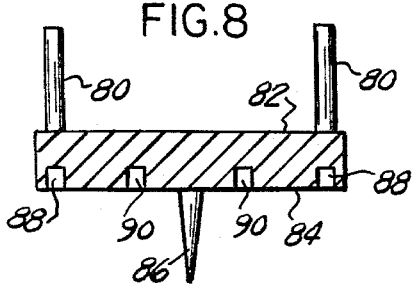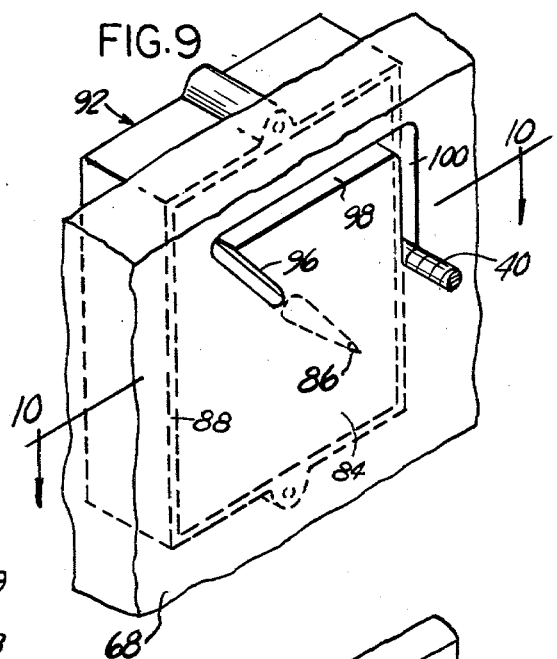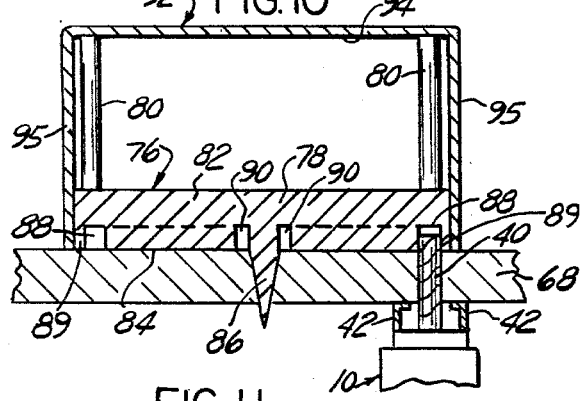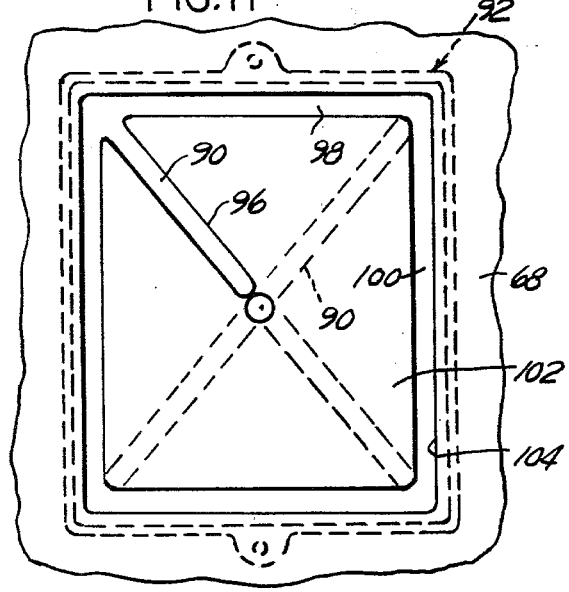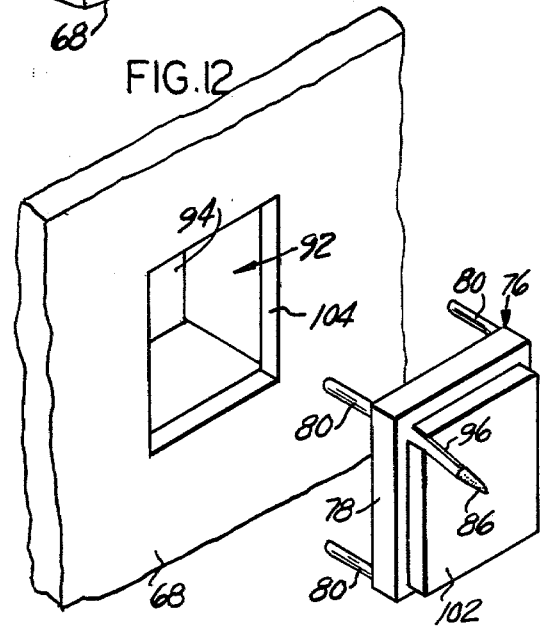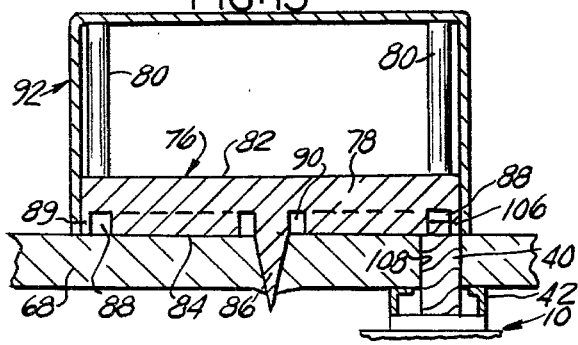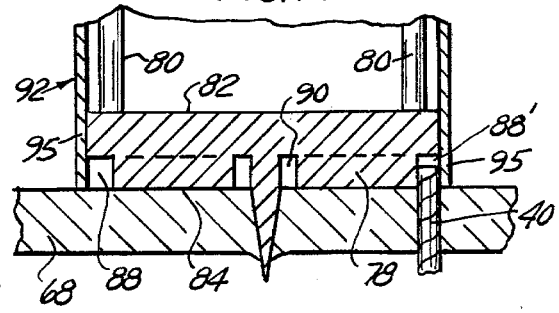

METHOD FOR CUTTING WALLBOARDS

BACKGROUND OF THE PRESENT INVENTION

The present invention relates to a portable power driven tool for cutting wallboards either before or after installation of the wallboards on support studs of a wall partition.

It is particularly advantageous in order to install wall panels, such as gypsum wallboards, rock wallboards and other wall panelling materials, rapidly and economically, to be able to cut the boards to size or to a particular contour, directly from a bundle of wallboards, prior to installing the boards by nailing on appropriate wall support stud members. Cutting wallboards to an appropriate size and shape with manually operated saws is time consuming and requires lengthy preparation work including measuring and tracing on the surface of the board lines along which the cuts are to be effected. Each board must be cut individually, after removing from the bundle, and tentative trial and error cuts are often effected until the appropriate size and contour are achieved. More particularly, openings must be pre-cut in wallboards installed over electrical or other utility boxes, and, in spite of careful measuring, it is often found that the pre-cut opening in the board is not quite of the size of the utility box opening or not quite located where desired. In addition to being time consuming, such a method results in considerable waste of material due to errors in locating cuts.

SUMMARY OF THE INVENTION

The present invention, by providing a portable power driven wallboard cutting tool, which comprises a built-in cutting depth adjustment and a ruler, permits to effectuate rapidly and accurately any desired cut in a wallboard, such as a gypsum or rock wallboard, prior to installing the board over a wall partition stud. More particularly, the portable power driven tool of the invention permits to effectuate straight cuts, or circular cuts, with accuracy and, as the depth of cut of the cutting tool can be adjusted with precision, to effectuate such cuts on a wallboard on the top of a bundle of wallboards. In addition, the power driven tool of the present invention when used with the utility box locating and cut-out guiding template of the invention permits to cut out rapidly and with accuracy utility box openings in already installed wallboards, without damaging the utility box and in perfect registry with the utility box opening.

These objects, and other objects and advantages of the present invention will become apparent to those skilled in the art when the following description of the best modes contemplated for practicing the invention is read in conjunction with the accompanying drawing wherein like reference numerals refer to like parts and in which:

BRIEF DESCRIPTION OF THE DRAWING

FIG. 1 is a schematic elevation view of a portable power driven cutting tool according to the present invention;

FIG. 2 is a partial section thereof from line 2—2 of FIG. 1;

FIG. 3 is a front end view thereof from line 3—3 of FIG. 2;

FIG. 4 is a schematic illustration of the method of the invention using the portable power driven tool of FIGS. 1-3 for effecting a straight cut in a wallboard;

FIG. 5 is a schematic illustration similar to FIG. 4 but showing the manner in which the portable power driven tool of the invention is used for effecting a circular cut;

FIG. 6 is a front perspective view of a utility box locating and cut-out guide template for use in combination with the portable power driven tool of FIGS. 1-3;

FIG. 7 is a rear perspective view thereof;

FIG. 8 is a section along line 8—8 of FIG. 6;

FIG. 9 is a schematic perspective view of the template of FIGS. 6-8, in position in a utility box, used for locating and guiding a cut in the wallboard;

FIG. 10 is a section therethrough along line 10—10 of FIG. 9;

FIG. 11 is a front elevation view thereof showing the outline of the finished cut;

FIG. 12 is a perspective view similar of FIG. 9, at a different scale, showing the finished cut-out portion; and FIGS. 13 and 14 are views similar to FIG. 10, but showing modifications of the apparatus and method of the invention.

DETAILED DESCRIPTION OF THE PREFERRED EMBODIMENTS

Referring to the drawings, and more particularly to FIGS. 1-3, a power driven wallboard cutting tool according to the present invention comprises preferably a portable cutting unit 10 designed to be hand held by a workman, and a remote drive unit 12, shown at a smaller scale, supplying power through a flexible sheathed cable 14 to the hand held cutting unit 10. The remote power drive unit 12 is preferably an electrical motor which may be disposed on the ground at the work site or, in the alternative, which may be carried on the back of the workman using the cutting unit 10 by means of a strapping harness 16. Alternatively, the portable cutting unit 10 may be provided with a built-in power unit, such as an electric motor, at the cost of a slight increase in weight.

The portable cutting tool unit 10 is in the form of a housing 18 provided at a convenient location with an on and off switch 19 which, through an electric cable 17 attached to the flexible drive cable 14, controls the start and stop of the electric motor of the drive unit 12. The housing 18 encloses a rotatable shaft or spindle 20, FIG. 2, driven in rotation by the sheathed cable 14, in a manner well known in the art. The spindle 20 is supported rotatably by appropriate bearings from the interior wall of the housing 18. One such bearing is shown at 22 at FIG. 2. The outer race of the bearing 22 is press-fitted or otherwise fastened within the housing 18 at the inner end of a reduced diameter portion 24 of the housing 18, the inner race of the bearing 22 being press-fitted or otherwise fastened to the rotatable spindle 20. A sleeve member 26 is disposed slidable within the reduced diameter portion 24 of the housing 18, and the spindle 20 disposed within the sleeve 26 is supported co-axially therefrom by means of a bearing such as ball bearing 28. The outer race of the bearing 28 is fastened by press-fitting or by means of appropriate retainer rings, not shown, within the internal bore 30 of the sleeve member 26, and the inner race of the bearing 28 is longitudinally slidably mounted relative to the spindle 20 by being connected thereto, for example, by way of one or more tangs 32 projecting from the internal bore of the inner race and slidably engaging a corresponding longitudinal groove 36 in the periphery of the spindle 20.

A chuck 38 is mounted on the end of the spindle 20, and a cutting tool, such as a routing rotary cutter 40, is removably mounted in the chuck 38 for rotation by the spindle 20. The sleeve member 26 is provided with, for example, three forward projecting legs 42 integrally formed at the edge of the sleeve member 26 or attached thereto, each of the legs 42 having an end face provided with an elastomeric cushioning pad 44. A pin or handle 46 projects radially from the peripheral surface of the sleeve member 26. The reduced diameter portion 24 of the housing 18 is provided with a longitudinal slot 48 having at its edge a plurality of regularly spaced notches 50 in which a peripheral portion of the handle 46 is engageable. In this manner, by displacing the handle 46 longitudinally through the slot 48, the sleeve member 26 is displaced longitudinally relative to the reduced diameter portion 24 of the housing 18, with the result that the legs 42 are adjustable in their length of projection from the end of the reduced diameter portion 24 of the housing 18 and, by engaging a portion of the periphery of the handle 46 in any appropriate notch 50, the sleeve 26 is locked in an appropriate position providing a predetermined depth of cut. A locking bar 52 provided with a finger graspable knob 54 at its free end, is hinged at its other end by means of a pin 56 to pivot relative to the reduced diameter portion 24 of the housing from a locking position whereby the locking bar 52 is disposed within the slot 48, causing the handle 46 to be immobilized in one of the notches 50, to an unlocking position pivoted away from the slot 48, as best shown at FIG. 2, permitting to disengage by rotation the handle 46 from one of the notches 50 and to longitudinally displace the handle 46 and consequently the sleeve 26 to an appropriate position allowing to reinsert, by rotation, the handle 46 in one of the notches 50, such as to adjust the projecting length of the legs 42. A spring clip, not shown, or any other appropriate means, maintains the locking bar 52 in its closed locking position engaged in the slot 48.

It can thus be seen that by adjusting the amount by which the legs 42 project from the end of the reduced diameter portion 24 of the housing 18, the length of the cutting tool 40 projecting beyond the plane of the elastomeric pads 44 may be adjusted, which in turn provides an adjustment of the depth of cut of the cutter 40. Alternatively, it will be appreciated that the legs 42 may be mounted stationary on the end of the housing reduced diameter portion 24, and that the spindle 20 may be made longitudinally displaceable by means such as, for example, a fork disposed on the end of a pivotable lever and engaging a peripheral groove in the spindle, or the like. With the sleeve member 26 completely retracted within the housing reduced diameter portion 24, the chuck 38 may be reached through the space between consecutive legs 42 and rotated by means of an appropriate spanner having prongs introduced in holes 58 on the periphery of the chuck ring for rotating the chuck ring and removing the cutter 40.

An annular housing 60 is mounted around the housing reduced diameter portion 24 at its end, and a ruler which may be in the form of a conventional flat spring steel ruler or in the form of a cable 62 is normally retracted within the annular housing 60 with its end, provided with a ring 66, projecting from the annular housing 60 through an aperture 64. By pulling on the ring 66, any appropriate length of the ruler cable 62 is pulled from the housing 60 against the action of a spring return, not shown. The ruler cable 62 may have a predetermined length, or, in the alternative, several separate ruler cables 62 may be disposed in the annular housing 60, each provided on its end with a ring 66 and having a different length. In the alternative, a single length of flat ruler or a single length of ruler cable 62, having appropriate length markings, may be disposed in the annular housing 60, and a locking mechanism, well known in the art of rulers, may be provided, for immobilizing the ruler or ruler cable 62 after a predetermined length thereof has been pulled from the annular housing 60.

By means of the ruler cable 62, and as illustrated at FIG. 4, a wallboard 68 can be cut along a straight line 70 by pulling an appropriate length of ruler cable 62 from the annular housing 60, placing the ring 66 against the edge of the wallboard and sliding it along the edge of the board with one hand and holding the cutting unit 10 with the other hand while effecting the cut. Similarly, as illustrated at FIG. 5, a circular cut 72 may be obtained by pulling a predetermined length of ruler cable 62 from the housing 60, planting a nail 74 into the wallboard 68 through the ring 66, and cutting a circle having the length of ruler cable 62 as a radius. The projecting length of the legs 42 is preferably adjusted such that the depth of cut corresponds to the thickness of the wallboard 68 with the result that a cut may be effected in the top board of a bundle without marring the subjacent board or in the alternative, by adjusting the position of the legs 42 and using, if so desired, a longer routing cutter 40, several superimposed boards may be cut in unison to an appropriate length or shape. The elastomeric pads 44 on the end face of the legs 42 protect the surface of the board being cut and absorb vibrations.

The portable wallboard cutting tool of the invention has particular applications for cutting out openings in wallboards, after the wallboards have been installed, to gain access to electrical, telephone, television, and the like, outlet and utility boxes, in conjunction with a utility box locator and cut-out template 76, FIGS. 6–8. The utility box locator and cut-out template 76 is made of plastic or, preferably, metal in the form of a plate 78 having a plurality of legs 80, for example four legs 80, projecting from its rear face 82. The front face 84 of the template plate 78 has a sharp projecting prong 86 disposed substantially at the center, and a peripheral continuous groove 88 formed proximate the edge of the front face 84. A pair of diagonal grooves 90 are disposed such as to extend between the foot of the prong 86 and each corner of the peripheral groove 88.

In use, a locator and cut-out template 76 is disposed in each utility box 92, FIGS. 9–12, prior to installing the wallboards 68. The ends of the legs 80 of the locator and cut-out template 76 engage the bottom 94 of the utility box 92, and the length of the legs 80 is such that the front face 84 of the locator and cut-out template is thus disposed flush with the edge of the utility box opening against the rear surface of the wallboard 68. During installation of the wallboard 68 the sharp prong 68 pierces the board and the tip of the prong projects to the outside of the wallboard 68 when the wallboard is pushed against the utility box 92 and nailed to the wall studs, not shown. The projecting end of the prong 86 thus provides a visual indicator of the location of the center of each utility box 92. In order to cut out the wallboard 68 to gain access to the utility box opening the power driven hand tool unit 10 is used to drill through the wallboard proximate the projecting portion of the prong 86 until the tip of the cutter 40 projects into one of the diagonal grooves 90. The tool unit 10 is manually displaced along the groove 90 to effectuate a first diagonal cut 96, FIGS. 9 and 10, toward a corner, and is subsequently displaced laterally with the tip of the cutter 40 being guided by the peripheral groove 88 of the locator template 76 such as to effectuate, for example, a horizontal cut 98, followed by a vertical cut 100 upon reaching the next corner of the guide groove 88 until the full periphery of a cut-out portion 102, FIGS. 11 and 12, has been cut from the board 68. By removing the cut-out portion 102 and the template 76, which can thus be reused, an accurate and clean opening 104 is obtained in the board 68 corresponding to the opening of the utility box 92.

Because the peripheral groove 88 in the locator and cut-out template 76 has a thin peripheral sidewall 89, the opening 104 cut in the wallboard 68 is slightly smaller than the plate 78 of the locator and cut-out template 76. Consequently, some difficulty may be experienced in removing the locator and cut-out template 76 from the utility box 92 without further trimming of the edge of opening 104, especially when the wallboard 68 is made of relatively strong material. To avoid such an inconvenience, a routing tool 40', FIG. 13, is used for effecting the peripheral cut 98-100. The routing tool 40' is provided with a pilot portion 106 projecting into the peripheral groove 88 of the locator and cut-out template 76, the overall diameter of the routing tool 40' being such as to provide a cut 108 in the wallboard 68 which clears entirely the area of the front face 84 of the locator and cut-out template plate 78.

Alternatively, a shown at FIG. 14, the locator and cut-out template 76 may be provided on its front face 84 with a peripheral stepped land 88', which results in defining a groove having the edge of the sidewall 95 of the utility box 92 forming the exterior sidewall of the groove. Such a structure for the locator and cut-out template 76, although more particularly useful for use with utility boxes 92 made of metal, can also be used for utility boxes made of plastic.

Having thus described the present invention by way of example of structure thereof, modification whereof will be apparent to those skilled in the art, what is claimed as new is as follows:

1. A method for locating a utility box having an opening disposed behind an installed wallboard and for cutting off a portion of said wallboard covering the opening of said utility box, said method comprising placing in said utility box a locator and cut-out template member having a surface substantially flush with said utility box opening and a prong member disposed substantially at the center of said surface for indicating by projection through said wallboard the location of said utility box, said surface having a peripheral groove defining the periphery of a portion to be cut out from said wallboard, and at least one groove leading from said prong to said peripheral groove, said prong providing an indication of the location of said one groove, drilling with a hand tool provided with a rotary cutter through said wallboard proximate the projection of said prong through said wallboard for projecting the tip of said cutter into said one groove, effecting a cut in said wallboard with the tip of the cutter of said hand tool projecting within and being guided by said one groove until said peripheral groove is reached, effecting a closed cut in said wallboard with the tip of said cutter projecting within and being guided by said peripheral groove, removing the portion cut out from said wallboard, and removing said locator and cut-out template member from said utility box.

2. The method of claim 1 wherein said hand tool has means adjusting the depth of cut of said rotary cutter.

* * * * *

UNITED STATES PATENT AND TRADEMARK OFFICE
CERTIFICATE OF CORRECTION

PATENT NO. : 4,359,302
DATED : November 16, 1982
INVENTOR(S) : Bryan Payne

It is certified that error appears in the above—identified patent and that said Letters Patent are hereby corrected as shown below:

Column 4, line 62, change "68" second occurrence to -- 86 --.

*Signed and Sealed this*

*Twenty-fifth* Day of *January 1983*

[SEAL]

Attest:

GERALD J. MOSSINGHOFF

*Attesting Officer*     *Commissioner of Patents and Trademarks*